ALVIN EDWARD MOORE,
INVENTOR.

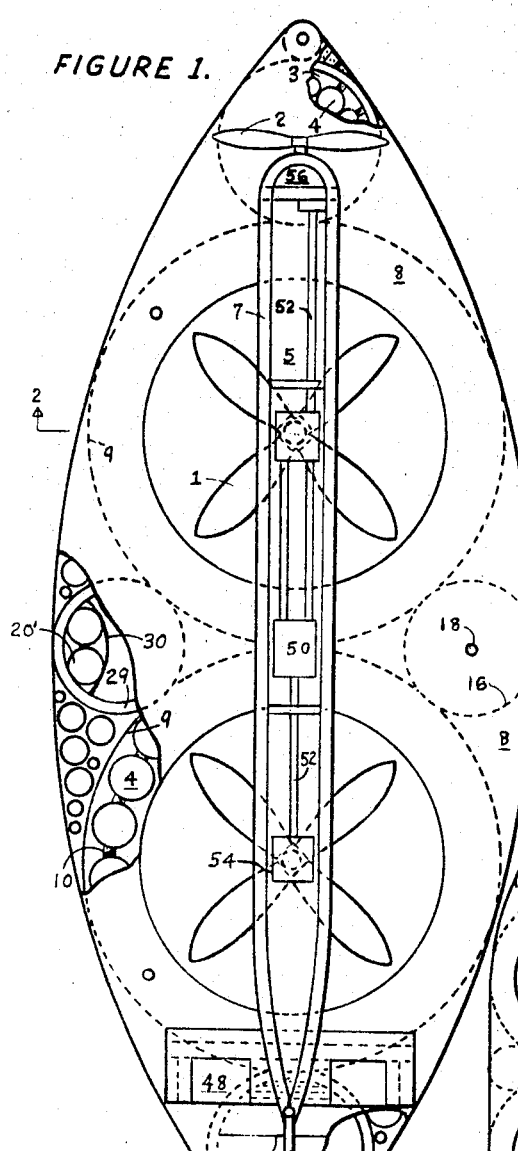
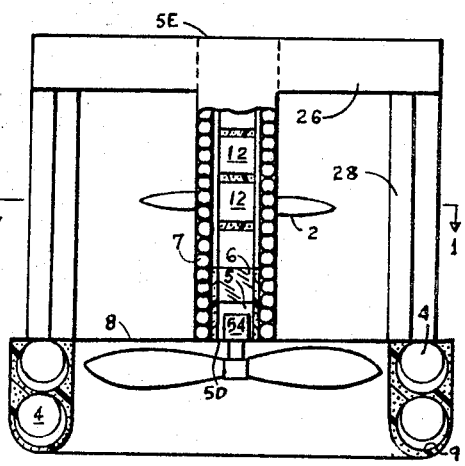
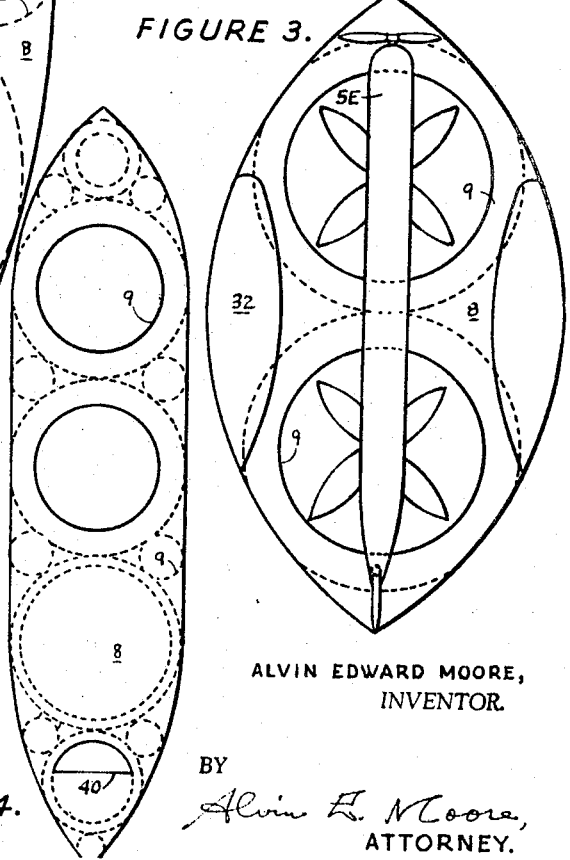
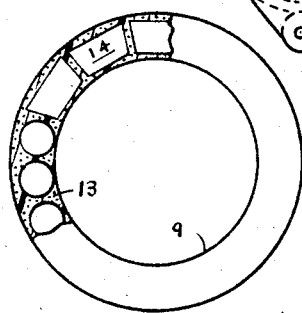
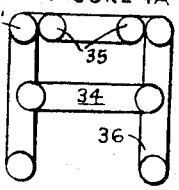
ALVIN EDWARD MOORE,
INVENTOR.
BY
*Alvin E. Moore,*
ATTORNEY.

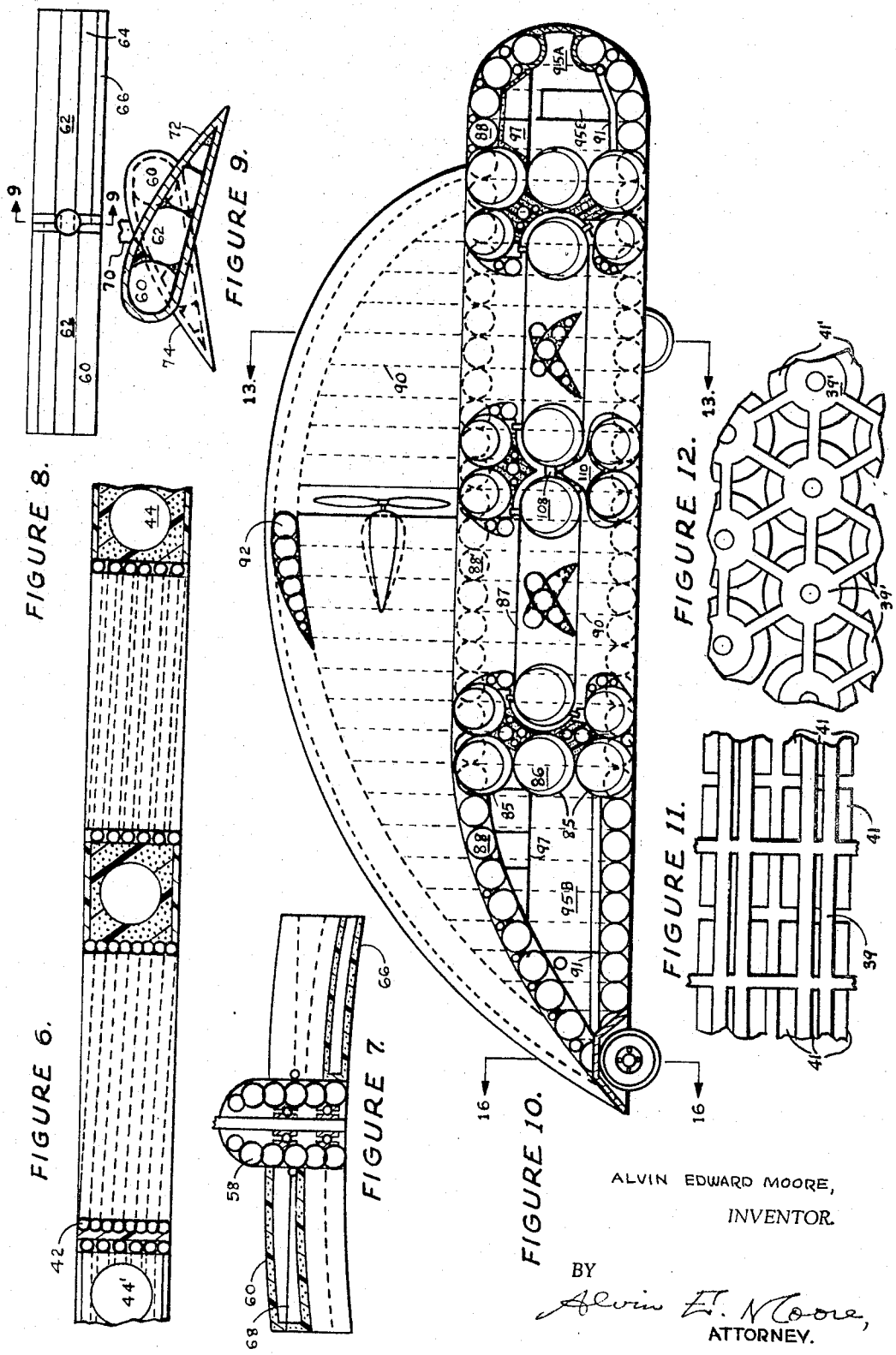

June 17, 1969   A. E. MOORE   3,450,374
RESILIENTLY FLEXIBLE VEHICLE
Filed March 3, 1966   Sheet 4 of 7
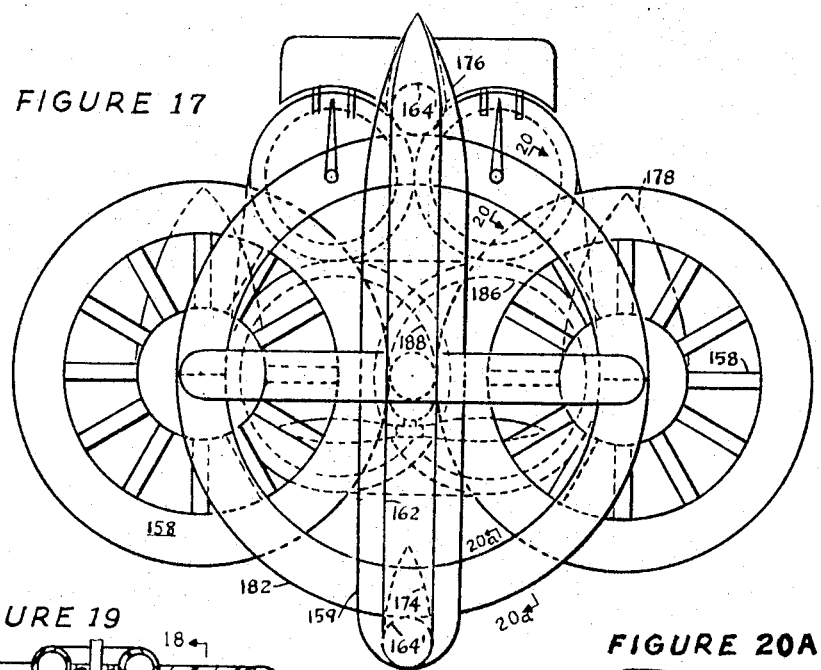
FIGURE 17
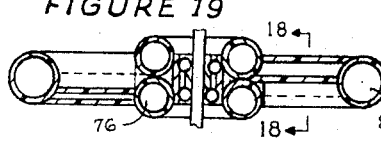
FIGURE 19
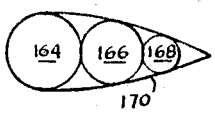
FIGURE 20A
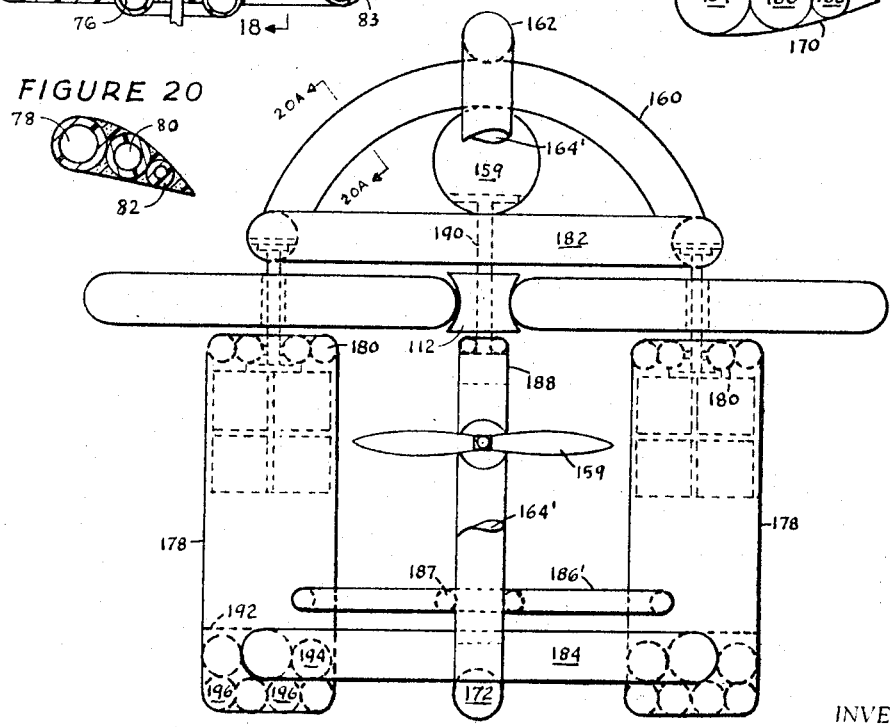
FIGURE 20
FIGURE 18
INVENTOR:
ALVIN EDWARD MOORE,
BY
Alvin E. Moore,
ATTORNEY.

June 17, 1969  A. E. MOORE  3,450,374
RESILIENTLY FLEXIBLE VEHICLE
Filed March 3, 1966  Sheet 5 of 7
FIGURE 21.
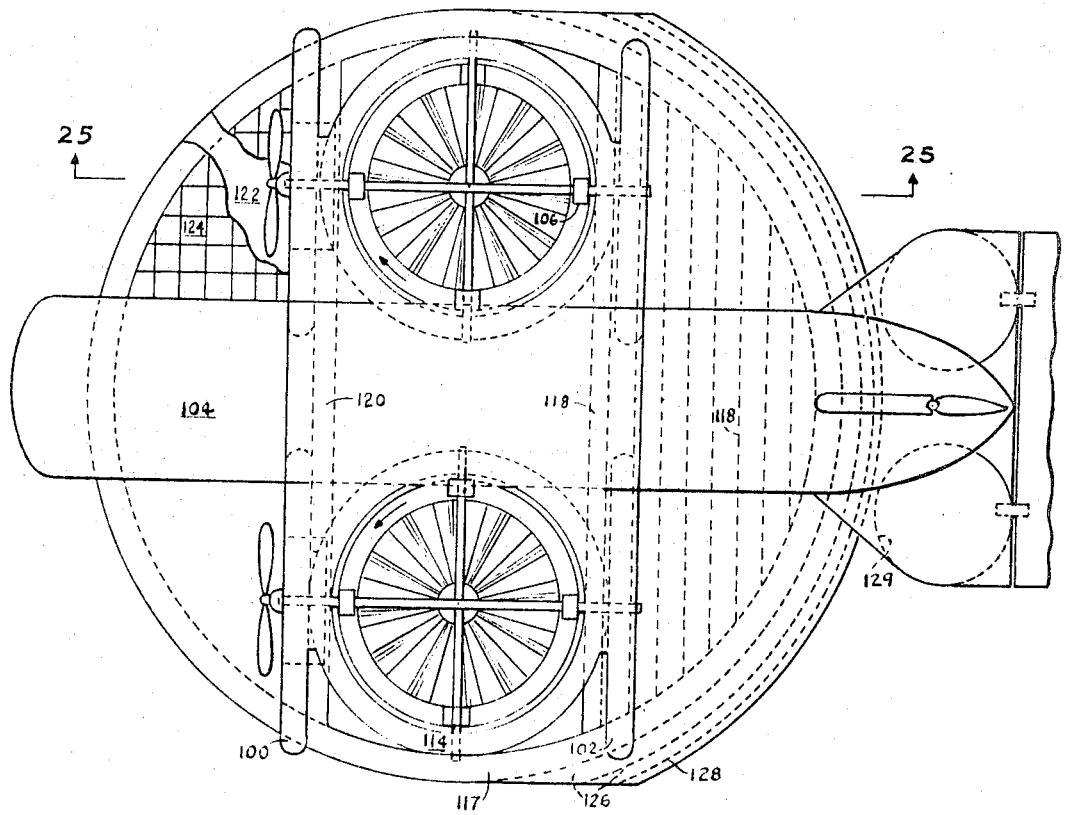
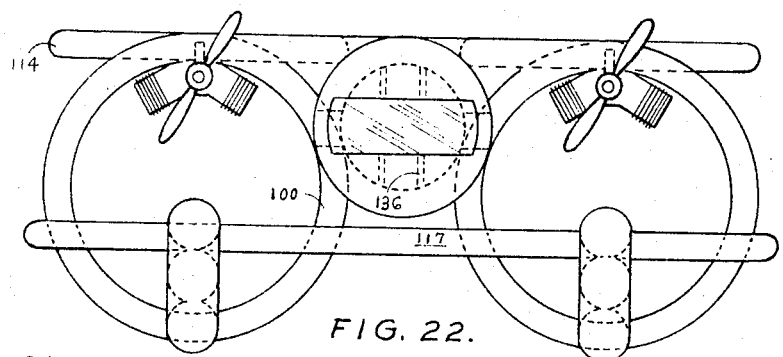
FIG. 22.
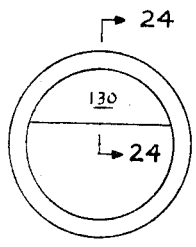
FIG. 23.
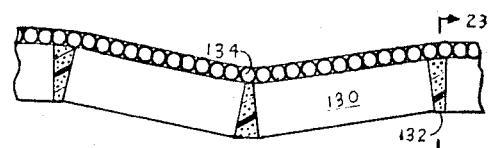
FIG. 24.
ALVIN EDWARD MOORE,
INVENTOR.
BY Alvin E. Moore,
ATTORNEY.

ALVIN EDWARD MOORE,
INVENTOR.

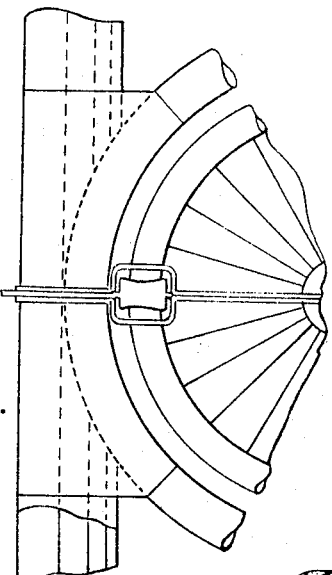
FIG. 33.
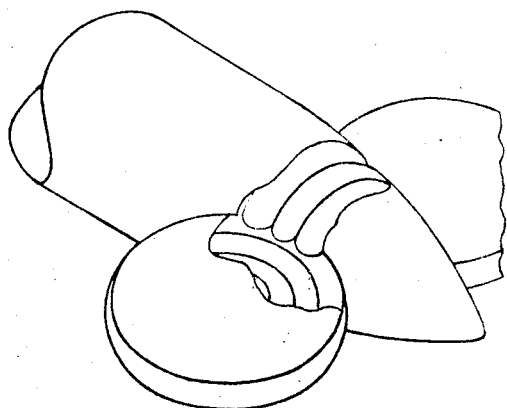
FIG. 34.
FIG. 35.
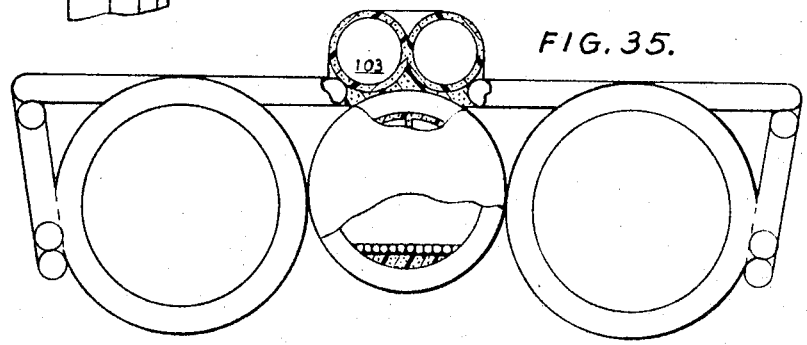
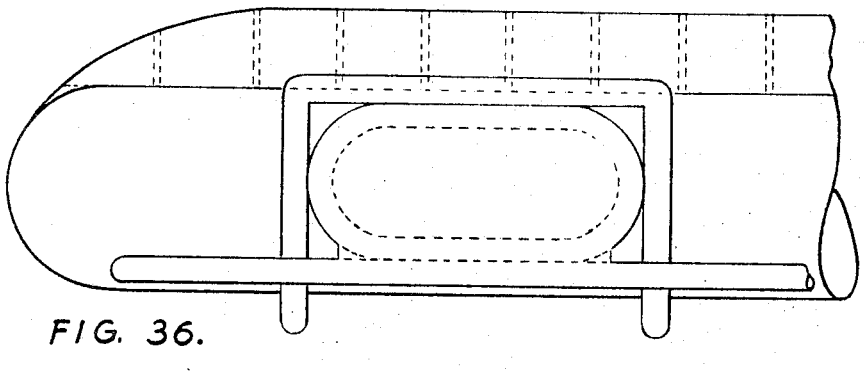
FIG. 36.

United States Patent Office 3,450,374
Patented June 17, 1969

3,450,374
RESILIENTLY FLEXIBLE VEHICLE
Alvin Edward Moore, 916 Beach Blvd.,
Waveland, Miss. 39576
Filed Mar. 3, 1966, Ser. No. 531,567
Int. Cl. B60v 3/06, 3/08; B63b 5/00
U.S. Cl. 244—5                           42 Claims

ABSTRACT OF THE DISCLOSURE

A shock-resistant vehicle, adapted for use as an aircraft, boat (or hovercraft), or land conveyance, having: a forward propeller; vertical-lift propellers; motors driving the propellers; and outer structure which comprises flexible mesh, plastic impregnating the mesh, and (optionally) inflated, resilient, vehicle-framework tubes which may be of thin metal or mesh-and-plastic. Preferably the tubes are hermetically sealed and permanently inflated with high-pressure, lighter-than-air gas. The craft optionally comprises a balloon in its upper part, and an engine that is placed low in the vehicle and supplies hydraulic fluid or other energy to the propeller-driving motors.

---

This invention pertains to a resilient, light-weight vehicle, which may be a land vehicle, boat, or water-skimming hovercraft; but preferably it is a quick-takeoff aircraft of the helicopter or hovering-craft type.

Having been conceived in impractical form by Leonardo da Vinci over four centuries ago, the helicopter is based on one of the oldest aeronautical dreams of man. Although in its present form it is operable, it is very complicated, expensive, vibrates a great deal, requires frequent repair, and is subject to crashes, often because of a broken-off helicopter blade. The need for a helicopter or hovercraft that is not very complicated and is little subject to breaking up due to vibration or storm, wave or crash shocks is therefore one of the pronounced necessities for the further advancement of man in air travel. If it can be successfully filled, the average man doubtless will become an aircraft or hovercraft owner and operator.

In view of the great number of damaging and fatal crashes of land water vehicles, a need for this general type of safe craft also is strongly in evidence in the fields of boat-building, submarine-building, and wheeled-craft construction.

In view of these facts, an object of the present invention is to provide a strong, light-weight vehicle that comprises a crash-resistant propeller which exerts a lift on it and that is sufficiently flexible in its outer portions to yield under major shock and then to return, without damaging deformation, to its normal shape.

Another object is to present a flexible, lift-providing vehicle which has at least one upright, substantially vertical axis, preferably resilient-walled fluid conduit and, mounted within this conduit, a lifting propeller.

A further object is to devise a strong but flexible impeller.

Another objective is to provide a flexible vehicle having strong but resiliently flexible propelling means, functioning within resilient, upright, fluid-conduit walls.

Another purpose is to present a strong, light-weight, vehicular structure, comprising a skin and, arranged within the skin, a plurality of doughnut-shaped, hollow elements that contain lighter-than-air gas; and a further objective is to provide such structure in which the doughnut-shaped tubular elements are of thin flexible metal, are permanently inflated and are hermetically sealed against escape of the gas.

Some other objects of the invention are: (1) to provide a strong, light-weight vehicle which comprises: at least one ring (annular member) having an upright-axis central space which contains a lifting propeller and provides for the passage of propelled fluid from above the vehicle to below it, the wall of said ring comprising a strong, flexible skin adjacent to the propelled fluid and, radially outward of the skin, a sealed, thin-walled, helically wound tube which contains gas at a pressure well above that of the atmosphere; (2) to provide such a propeller-containing member in which the helically wound tube is of metal; (3) to present a light-weight vehicular structure comprising a strong, flexible, doughnut-shaped skin, within the skin a plurality of gas-containing receptacles, and porous plastic filling the spaces between the receptacles and the skin; and (4) to produce a very light-weight and strong hovercraft, based on water or land, having a forward propeller and a plurality of lifting propellers that are in strongly inflated tubular members; the lifting propellers being adapted to raise part of the craft's weight above the surface medium of its travel or, on application to them of greater power, to lift all of its light weight above this medium and fly as an aircraft.

The foregoing and other objects of the invention will become more fully apparent from the following detailed description of several forms of the invention and from the accompanying drawings. For clarity of illustration, the showing in these drawings of certain inflated tubes is hatched to indicate synthetic rubber or other plastic; but in practice the plastic of these tubes may be reinforced with fibrous or metallic fabric or mesh.

FIGURE 1 is a top plan view, partly in section, of one species of the invented vehicle. This form of the craft is closely similar to but varies in details from that shown in FIGURE 2; the sectional view of the cabin in FIGURE 1 is from a plane comparable to that indicated by the lines 1—1 of FIGURE 2. In FIGURE 1 the following structures of FIGURE 2 are not shown: the side, wing-supporting and bracing struts 28; the wing or bracing elements 26; and the cabin-contained, lighter-than-air units 12. Elements 26 and 28 are optional; but in practice the lighter-than-air units 12 preferably are utilized in the upper part of the cabin 5 of FIGURE 1, as in FIGURE 2. In FIGURE 1, the skin of the main deck 8 is shown as partly broken away at the bow, stern, and on the port side of the craft to expose the interior of the deck.

FIGURE 2 is an elevational view of the invention form of FIGURE 1. It shows the main deck, one of the lifting propeller assemblies and the lower part of the cabin 7—5E in section from the plane 2—2 of FIGURE 1; but it shows in elevation the upper part of the cabin, the optional upright side struts 28, and the optional aerodynamic wing 26 that is supported and braced by the struts and cabin. The wing and these struts optionally may be added to the structure of FIGURE 1, adjacent to the forward lifting propeller 1.

FIGURE 3 is a plan view of the general type of craft shown in FIGURE 1, with some variations in width and structure.

FIGURE 4 is a plan view of the deck and float part of another craft of the invention species shown in FIGURE 1, but narrower in beam and providing more after deck space; this view shows the lower part of the vehicle before the upper propelling and load-housing structure (indicated in FIGURE 1 at 1, 2, 5, 7, 46, 48, 50, 52 and 56) is joined to it.

FIGURE 4A is a detail, elevational, sectional view from a plane normal to the craft's longitudinal axis, illustrating the structure of an alternative deck-and-float portion of a small, very simple form of the invented vehicle.

FIGURE 5 is a detail plan view, partly broken away, showing a variation in the type of light-weight, resilient, strength-providing ring structure that is incorporated in the body of the vehicle and in the propeller tubes.

FIGURE 6 is a detail, sectional view of an alternative type of the resilient ring structure.

FIGURE 7 is a detail, sectional view of one form of the light-weight, resilient lifting propeller from a plane thru the propeller's axis.

FIGURE 8 is a top plan view of another form of the lifting propeller.

FIGURE 9 is a sectional view from the plane 9—9 of FIGURE 8.

FIGURE 10 is a sectional view from a vertical plane thru the vehicle's longitudinal axis, illustrating a second species of the invention.

FIGURE 11 is a detail plan view of one form of the lighter-than-air units of the invention, shown as grouped under a flexible buffer.

FIGURE 12 is a detail plan view of another form of the lighter-than-air units and another type of the buffers.

FIGURE 17 is a top plan view of a fourth form of the invention.

FIGURE 18 is a front elevational view of the vehicle of FIGURE 17.

FIGURE 19 is a detail, sectional view of the lifting propeller shown in FIGURE 17.

FIGURE 20 is a detail, sectional view on a larger scale from either of the planes 20—20 of FIGURE 17 and 18—18 of FIGURE 19.

FIGURE 20A is a detail, sectional view from the plane 20A—20A of FIGURE 18, but showing a variation in the attachment of lower bracing tubes (186 or 186') to the engine nacelle.

FIGURE 21 is a top plan view of a fifth species of the invention, showing part of the skin of the lower forward fairing as broken away to expose the lighter-than-air units 124 of the fairing.

FIGURE 22 is a front elevational view of the craft of FIGURE 21.

FIGURE 23 is a detail, sectional view from a plane normal to the vehicle's longitudinal axis (indicated by the lines 23—23 in FIGURE 24), of the type of cabin shown in FIGURE 22, but showing a cabin-wall ring of a smaller diameter than that indicated in FIGURE 22.

FIGURE 24 is a detail, sectional view from the line 24—24 of FIGURE 23 showing part of the resilient cabin wall as temporarily bent by a storm force, or by other shock such as in a crash landing.

FIGURE 33 is a detail, plan view, partly broken away, of another form of the lifting-propeller supporting structure.

FIGURE 34 is a detail, perspective view of one form of the stabilizing tail structure of the craft of FIGURE 21, comprising resilient-ring stabilizing fins.

FIGURE 35 is a front elevational view, partly broken away and in section, of a variation of the species of the invention shown in FIGURE 21, with the motor, propellers and their supports omitted.

FIGURE 36 is a side elevational view, partly broken aawy, of the forward structure of FIGURE 35.

Figure 13:
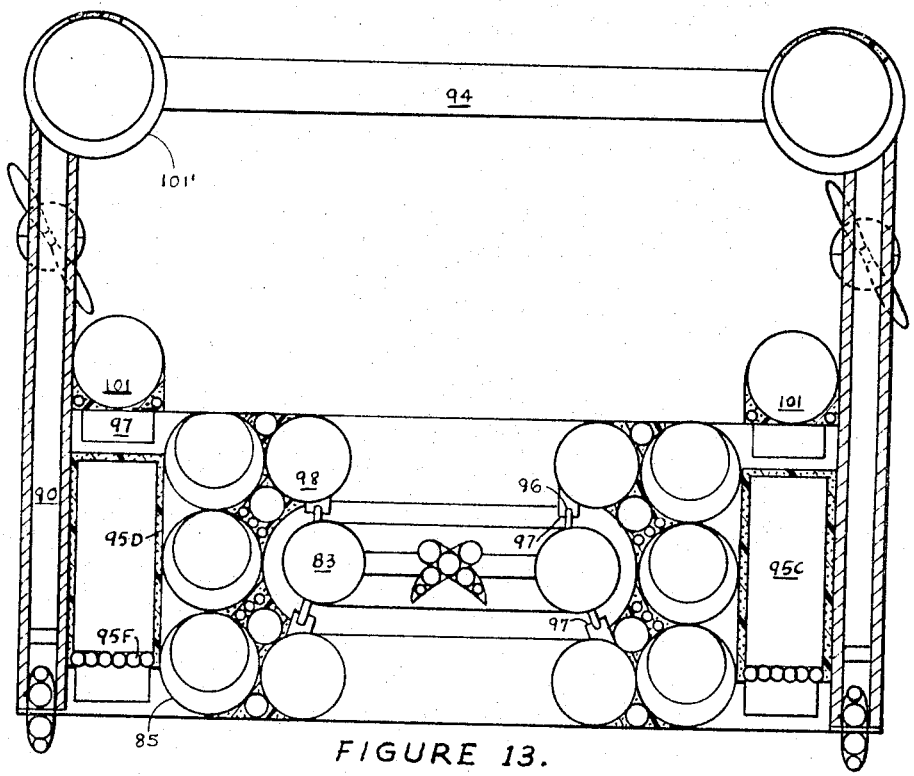
FIGURE 13 is a sectional view of the species of vehicle shown in FIGURE 12, from a plane comparable to that indicated by lines 13—13 in FIGURE 12, but with its middle portion shown as considerably wider than the craft of FIGURE 12.

FIGURES 1 to 4A illustrate a species of the invention in which the deck and landing structure of the vehicle are considerably wider than the slim, high superstructure which is fixed at its bottom to the main deck 8. This superstructure provides a load-confining space. It may house only the power plant for driving the lifting propellers 1 and the forward propeller 2, in which event the pilot and passengers may sit in the forward ring-shaped compartment 3 (with the lighter-than-air cylindrical or spherical units 4 removed from the room and a window placed in its bow). But as shown in FIGURES 1 to 4 the superstructure, although narrow, is wide enough to provide a cabin space 5, in which both the passengers and the power plant are housed. This cabin, which extends from the bow to the stern, comprises deck 5D, a forward transparent window 6, set in the nose of the craft, a door in its resilient side walls, and may have other windows in the walls. The forward window 6 is not illustrated in FIGURE 1 because the bow of the cabin is shown in this figure as being in section along a horizontal plane thru the forward motor 56, which is located well above the window. On each side of engine 50 and motors 54 there is a passageway wide enough for the passage of a person between the parts of the cabin space.

The cabin side walls, streamlined at the bow and stern, are formed of an outer skin of fibrous or metallic fabric impregnated and coated with rubber or other plastic and, within this skin, inflated, elongated, vertically stacked tubes 7, which optionally may be flexibly bonded to the outer and inner skins, for example with liquid-rubber cement that sets into rubber in the atmosphere. The top or cover 5E of the cabin may have transverse, horizontal tubes of the same type, but as shown it consists of the fabric-and-plastic skin that incloses the cabin space and side-wall tubes. This skin is tautly stretched over the tubes.

The cabin deck skin 5D is shown as of the same thickness as and integral with the upper skin 8 of the main deck in the lower part of the vessel. Both the cabin deck and the main deck may be further strengthened by the type of elongated, inflated tubes that are shown at 7 and, in FIGURE 10 at 91. As shown in FIGURE 1, the cabin and main deck, as well as other skins in this invention have relatively thin, strong, material, which (especially in the deck) is preferably of metal mesh or other metal fabric, impregnated and coated with rubber or other plastic. This reinforcing mesh may be of soft iron, copper or aluminum or magnesium alloy, but preferably its material is spring steel, resilient Phosphor bronze or tough, springy plastic. The plastic which coats and impregnates the mesh optionally contains reinforcing fibers, for example of asbestos or thermosetting plastic or organic matter; or it may comprise sand or sawdust.

The deck skin is originally placed under tension by cutting and/or forming its mesh (or alternatively its mesh and plastic) to the proper shapes and areas, around the strength-providing framework tubes 9 while they are only moderately inflated. Then, after the edges of the mesh or waterproofed-fabric skin are securely joined (by gluing and sewing them with nylon or metallic thread), the tubes are further inflated, thus placing the mesh or skin under substantial tension. These framework tubes may be of the straight, elongated type shown in FIGURE 10, but in the vehicle of FIGURES 1 to 4A they are ring or doughnut shaped. When they are doughnut-shaped the mesh is preferably first formed, fitted and tightened over the tubes, before the waterproofing and streamlining plastic is applied to the mesh.

The tubes 9 may be made of: fibrous or metal or other fabric, impregnated and coated with rubber or other plastic; solid flexible and/or resilient, high-density material, substantially impermeable to gas (such as thin, high-density springy plastic, thin copper, soft iron, aluminum alloy or aluminum, of a thickness for example of .005″ to .02″, or thin spring steel. Preferably, the walls of any of these tubes of high-density, solid, metallic materials are coated with a flexible plastic, such as rubber, before they are bonded together at their contacting peripheries. The glue used may be, for example, liquid-rubber cement, which sets quickly into rubber in ambient air. Preferably, at least the lower tubes 9, which are especially subject to shocks (and, when they are part of a boat, to wave action), are made of metal and, as indicated in FIGURE 2, are heavily coated with foam rubber or other flexible porous plastic, which extends all around each tube; and its porous material is sealed over by and bonded to a thin coat of nonporous rubber (for example, rubber cement) or other nonporous plastic. If desired, the cabin tubes 7 also may be made of metal. Or, alternatively, their thin walls may be of high-density, semirigid, dense plastic on one of the above-described reinforcing materials.

The tubes 9 also may be made of rubber and fabric (like common automobile or bicycle tires); and also the tubes 7 may be of this material (like rubber hose). In this event, they are preferably provided with inflation valves; and the larger tubes optionally may have, floating within their compressed-gas spaces, hollow spheres or short cylinders 12 made of one of the above-described dense materials which are substantially impermeable to gas, and filled with hydrogen, helium or other lighter-than-air gas at a pressure above that of the atmosphere. Alternatively, they may be of a rigid or nearly rigid dense material—for example, magnalium having a high percentage of magnesium, or glass, in which event the pressure of the sealed gas may be subatmospheric or only a little above that of the atmosphere.

Lighter-than-air units 4 are similarly made. These units preferably are buffered by flexible foam plastic—for example by pieces 10 of foam rubber or other porous, flexible plastic between the units and between them and adjacent outer walls.

In the upper part of the cabin superstructure, as shown in FIGURE 2, short, substantially square or rectangular lighter-than-air units 12 are located. These also are filled with a lighter-than-air gas, preferably at subatmospheric or approximately atmospheric pressure. These units are grouped in rows that are parallel with the vehicle's longitudinal axis, and have foam rubber or similar buffers between each pair and between the cabin wall or top and each adjacent unit. The lower surfaces of the lowest row serve as a ceiling of the cabin space 5.

An alternative type of cabin tube, which may be substituted for any of the tubes 9, is illustrated in FIGURE 5. This optional form is a doughnut-shaped ring 9, which optionally may be either circular or square in cross section (from its central space radially to its exterior). It comprises an outer skin of resilient fabric (a mesh of spring steel, resilient Phosphor bronze or springy plastic) which is impregnated with flexible plastic, preferably reinforced with asbestos or other fibers and, within the skin, porous, flexible plastic 13 (such as foam rubber), in which there are imbedded a plurality of the lighter-than-air units 14. As illustrated, these units may be spherical or substantially cylindrical.

Figure 28:
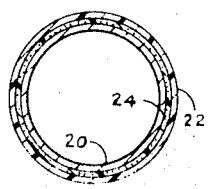
FIGURE 28 is a detail, cross-sectional view showing another form of the light-weight, resilient, strength-providing rings utilized in the invention.

Another optional type of the resilient tube used as an element of the vehicle's construction is shown in FIGURE 28. This illustration may be considered as representing either a cross section thru an arcuate part of a doughnut-shaped tube (such as is indicated at 9 in FIGURE 1, 85 in FIGURE 10, 98 in FIGURE 13, 182 or 158 in FIGURE 17 and 100 or 117 in FIGURE 21) or a section thru a straight or slightly curved tube of the type of element 7 from a plane that is normal to the straight tube's longitudinal axis. It also indicates an optional type of structure of such large resilient cylinders as the member 16 in FIGURE 1, which is shown as being inflatable thru inflation valve 18, but which, if made as indicated in FIGURE 28, would require no inflation valve but would be hermetically sealed.

In FIGURE 28 the numeral 20 indicates a central, gas-filled tube or cylinder that is made of one of the above-described high-density plastic or metallic materials that are substantially impermeable to gas. Preferably this material is aluminum, high-density plastic, or very thin sheet copper (for example of a thickness of .0012″ to .006″). Copper, which may be repeatedly stressed without crystallization and fracture, is an excellent metal for this purpose.

The gas that is hermetically and permanently sealed in the tube's hollow space is preferably helium, hydrogen, hydrogen mixed with a small percentage of explosion-inhibiting gas, such as nitrogen or carbon dioxide, or air. If the tube 20 is used to provide aerostatic lifting force on the vehicle, where not much strength is required of it— and especially if the craft is designed for flying fairly high in the air—this gas may be at a slightly subatmospheric pressure. Moreover, if the tube is used as a strength-providing element of the vehicular framework and its outer envelope 22 comprises strongly resilient plastic or metal (for example, spring steel), the gas optionally may be under such low pressure; but preferably its pressure is substantially above that of the atmosphere. Also if the tubular unit is to be used where it will not be subject to much stress the envelope 22 may be of flexible, nonresilient material and the tube 20 may be of rigid or semirigid material, such as rigid or semirigid plastic, or magnalium having a high percentage of magnesium, or other semirigid or rigid aluminum alloys. If both the inner tube 20 and the envelope 22 are flexible, preferably the tube 20 is of a very ductile and tenacious material, for example, one of certain plastics, thin copper, or thin, soft iron.

In any event, there is preferably interposed between tube 20 and envelope 22 a shock-absorbing sleeve 24 of porous, flexible plastic.

Having a vacuum in the tubes 20 that are used as aerostatic lifting units and are made of rigid material of course would be preferable in certain circumstances to lighter-than-air gas, and this feature is contemplated in the invention. But such inner tubes that are either rigid or are surrounded by very strong outer envelopes preferably contain lighter-than-air gas under a pressure which at sea or ground level is below that of the atmosphere at such level. This low pressure has several advantages. The net pressure difference between the gas in 20 and the ambient gas outside 22 increases with altitude (when the vehicle is an aircraft) and therefore, unless these elements are very strong, at a very high altitude one or the other might be ruptured. On the other hand, if the pressure in 20 at ground level is subatmospheric it will not become excessively strong at a high altitude, and the outer element 22 (unless it is a *major* strength-providing unit of the aircraft) then may be very thin-walled and light in weight.

Another advantage of the subatmospheric pressure, at sea level or in the air, lies in the fact that if at all there is a very slow permeation of gas thru the thin walls of tube 20, this movement of gas is of air *into* the tube and not of the relatively expensive lighter-than-air gas outward *from* the tube.

For clarity of illustration in FIGURE 28, the relative thickness of tube 20 is shown as enlarged. In practice, it is usually thinner than envelope 22. In some instances, however, the walls of the tube 20 may be thick enough and contain gas under sufficient pressure to be very strong, in which event one or both of the elements 22 and 24 may be made thinner than 20, or eliminated. The criterion of this aspect of the invention is: When tubular member 20–22–24 is to be used as a major strength-providing element of the vehicle's framework the wall thickness of 20 and/or 22 is increased until it is calculated to safely stand the stress to which it is apt to be subjected. In this event, this increase is preferably accompanied by a pressure inside the inner tube that is considerably above that of the atmosphere.

One of the preferred forms of this composite tubular member comprises: a very thin, flexible inner tube 20 of a material that is substantially impermeable to gas, for example, of copper, dense but flexible plastic, aluminum or soft iron of a thickness of about .0012″ to .005″ (in the case of aluminum or plastic this thickness is greater than when copper or iron is used); an outer element 22 which is strong enough to provide most of the strength to be required of the tubular member; and, optionally, a thin, shock-absorbing tubular element 24 (covering the tube 20), which may or may not be used. In this form of the tubular member, if the pressure inside 20 is above that of the atmosphere at sea or ground level the envelope 22 may be flexible and only slightly resilient (for example, nylon, other fibrous or ductile-metallic fabric, impregnated and coated with rubber or other flexible plastic; but if the pressure inside 20 is less than that of the atmosphere the envelope 22 strongly resists compression from the outside, and may be of strongly resilient material, such as spring steel, resilient Phosphor bronze, or tough, springy plastic, or mesh of one of these spring materials, impregnated and coated with flexible plastic.

In FIGURE 2, each of the lift-providing struts 26 comprises: an outer, streamlined skin of the type shown at 22; and, within this skin, a plurality of straight, gas-containing tubes of the type shown at 20, each of which is either covered by a very flexible tube 24 or is buffered wherever its surface is near the skin or another tube by very flexible elements of the type shown at 10 in FIGURE 1. These straight tubes, extending transversely of the longitudinal axis of the craft, are nested together so that their cylindrical surfaces bear against each other in the general fashion shown in FIGURE 20 or FIGURE 20A; and they are of different diameters, to provide for snug fitting inside the streamlined skin of 26. They may contain lighter-than-air gas and serve as balloons of substantial lifting force; and in this event they are arranged in the manner of FIGURE 20A, are larger shown in FIGURE 2 and their inner tubes 20 (of FIGURE 28) are very thin and light in weight. But preferably they contain such gas but are heavier than air, are strongly inflated to provide structural strength and are arranged and inclined in the manner of FIGURE 20, thus forming aerodynamic wings. In any event, they are braced and supported by secure attachment of one end of each strut to the cabin structure and of its other end to a streamlined, hollow strut 28, which has a fore-and-aft cross section similar to that of FIGURE 20A. This strut is preferably made of straight tubular inflated elements of the type shown at 20 (with buffering elements 24) and preferably contains lighter-than-air gas at a pressure considerably above that of the atmosphere. Optionally, in members 26 and 28, the tubes 20 may be covered with extra-strength-providing cylindrical envelopes 22, within the streamlined outer skins of 26 and 28.

Preferably, at least two of the tubes 20 that are a part of each strut 28 are fixed and braced to the main deck of the aircraft in tube 29, indicated in FIGURE 1. In this figure the elements shown at 20′ may be either short or spherical lighter-than-air elements (when no struts or wings are present in the vessel) or elongated strength-providing tubular elements 20 (or 20–22–24) which brace and hold the strut. In this latter event, they extend downward into and are securely attached to the vertically stacked tubes 9. This attachment may be made stronger by the strength-providing, resilient skin 30. The hollow space that is shown to the right of skin 30 may be used as a storage chamber or be filled with gas.

The craft of FIGURES 1 to 4 may be provided with wheels for ground use; or, if it is a flying or other boat, its buoyant lower surface may rest in the water or may be provided with floats. Such floats may comprise gas-containing, tubular, vertical-walled members, fixed to the side portions of the bottom of the main deck, that are externally shaped like the members 32 (balloons or load-carrying compartments) that are shown in FIGURE 3 as being fixed to the upper part of the main deck. For bracing and fixing these floats the four midship stacks of tubes 9 of FIGURE 4 may be extended to the bottoms of the two floats, along the vertical portions of their sides.

Alternatively, the main deck and floats, of the water-traversing form of the vehicle, may be of the type that is somewhat schematically shown in the raft of FIGURE 4A. In this sectional figure (from a vertical plane transverse to the craft's longitudinal axis), only one doughnut-shaped, skin-covered horizontal tube 34 is shown, as constituting nearly the whole width of a relatively narrow boat or small raft such as is shown in FIGURE 4A. But if a wider craft is desired, obviously there may be a plurality of such tubes across the beam, arranged flatwise within the main-deck skin of one of the above-described skin materials (in either staggered or unstaggered assembly, and having their adjacent arcuate peripheries bearing against each other thru the intermediary of buffers 10 or 24). In the wider craft they are preferably staggered and in longitudinal rows of an odd number (thus providing streamlining at the bow and stern) and in at least two of their hollow spaces lifting propellers 1 optionally may be mounted.

Figure 30:
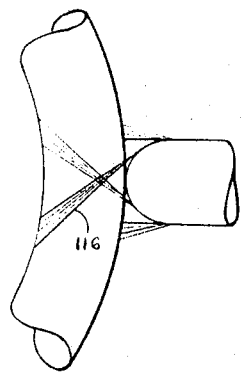
FIGURE 30 is a detail view showing one type of means for tying together the resilient rings of this invention.

To those radially outer surfaces of the tubes 34 which are adjacent an edge of the vehicle, vertical, float-providing, doughnut-shaped tubes 36 are tied and bonded. In a small raft, each of these tubes preferably has approximately the same overall diameter as that of the adjacent tube 34 to which it is fixed. The extent to which the outer periphery of each tube 34 extends into the central space of an adjacent vertical tube depends on the major, overall diameters and the minor cross-sectional diameters of the tubes. When used in a larger craft—of the general type shown, for example, in FIGURES 1, 3, 4 and 10—the aligned vertical tubes 9′ on each side of the vehicle are not only fixed to an adjacent horizontal deck tubes but are also fixed, at contacting peripheries to each other. The median plane of the flatwise assembly of these vertical tubes of each side row is parallel to the vehicle's longitudinal axis, the assembly stops at or short of the curvatures of the streamlined bow and stern skin. The contacting peripheries of all these tubes are fastened together by cords and bonding of the general type that is illustrated in FIGURE 30 and later described in this specification.

The skin on the outer surfaces of the deck and floats is applied after the above-described assembly and fastening together of the orthogonally arranged deck and float tubes. A life line may be fixed to the tops of the float tubes. Or, if desired, other vertical, doughnut-shaped, flexible-framework tubes may be assembled flatwise with the upper halves of the float tubes (staggered or unstaggered), to extend the sidewalls upward to the desired height of a cabin, and the upper surfaces of said other tubes may be bridged over with a second, cabin-top set of horizontal tubes, thus forming a cabin over a major portion of the main deck (a portion which contains no vertical fluid conduits for lifting propellers). These optional cabin-top inflated rings are shown in FIGURE 4A at 35. The complete assembly of four sets of doughnut-shaped tubes may be substituted, for example, for the tubes 88, 88′, 90 and the wheels of FIGURE 10, also later described in this specification.

The major and minor diameters of the doughnut-shaped tubes may be of different sizes in different tubes, as illustrated in FIGURES 1 to 5, depending on the outer shape of the vessel being designed. If they are of smaller minor cross-sectional diameters than the desired depth of the main deck they may be vertically stacked. Of if these diameters are thinner than the desired float thickness they may be pluralized in side-by-side assemblies that are aligned with their centers of major diameters in float-framework rows which are parallel with the longitudinal axis of the craft.

The central hollow spaces in some of these tubes may be utilized as storage chambers 38, which may be provided with hinged hatches 40. But most of the central annular spaces are filled with flexibly positioned, hollow, disk-like, lighter-than-air units, each of which has a clearance between its surface and any adjacent surface of a neighboring tube or vehicle wall. These clearances may be filled by porous-plastic buffers, surrounding the units, of the type shown at 13 in FIGURE 5, at 24 in FIGURE 28 and in other figures of the drawing—or may be partially filled with one or more of the types of buffers shown at 10 in FIGURE 1, 39 in FIGURE 11 or 39' in FIGURE 12. In FIGURE 11, cylindrical lighter-than-air units 41 exert their lifting force on an upper strength-providing element of the vehicle's framework via the buffer 39, which may be of foam rubber or other flexible porous plastic. In FIGURE 12 buffering units 39' are over spherical or cylindrical lighter-than-air units 41'. As illustrated, buffers 39 and 39' optionally may contain rather large apertures; such holes further lighten the weight of the vehicular structure.

One form of the airstream ring which preferably supports and houses each lifting propeller or fan, comprising vertically stacked, doughnut-shaped, relatively large-diameter tubes of the type shown at 9, is illustrated in FIGURES 1 to 3, 10, 13 and 14. Another form having a single, air-passage-providing propeller-supporting tube, is shown in FIGURES 21 and 22 at 114, and in FIGURE 33. And a third form of the lift-fan and airstream conduit is shown in FIGURE 6.

In FIGURE 6 each of the two illustrated propeller-supporting rings or conduits has a vertical annular wall which comprises a skin of one of the above-described types channeling the airstream from the lift fans and, radially outward of the skin's cylinder, a helically coiled inflated tube 42 of relatively small diameter, and of one of the kinds of tube materials set forth above. The spaces around and between these tubes optionally may be filled with very light-weight and slightly flexible foam plastic in which lighter-than-air units 44 are placed or (as indicated at the left of FIGURE 6) these spaces may have in them only a plurality of the lifting units 44', floating within the spaces, and preferably having buffers of the type shown in FIGURE 1 at 10 between them.

In FIGURE 1, which shows the cabin as in section from a horizontal plane that is thru the forward propeller and just above the rudder 46 and the elevators 48 at the tail of the craft, and with the cabin-contained buoyant units 12 removed, a top view of the preferred type of power plant used in the vehicle is shown. This power means comprises a central energy-generating unit 50 (an engine and either a pump for hydraulic or gaseous fluid or an electric generator), which supplies energy via fluid or electric conduits 52 to the motors 54 (which drive the lifting propellers) and to motor 56 (which drives the forward propeller). Advantages of this type of integrated power plant not only lie in the greater efficiency and less expense of a single large engine than three smaller engines would have, but also in the fact that a considerable part of the mechanism which drives the highly placed forward propeller is down on the cabin deck, where the engine (and the motors 54) are located. Since an important feature of this invention is the placing of an aerostatic center of lift (from the lighter-than-air units) which is above the center of gravity of the craft, thus stabilizing it and preventing capsizing, the lower that the principal loads practically can be placed the greater the degree of stability that is obtained.

Although the lifting propellers may be of a currently conventional type, they preferably are light in weight, somewhat resilient and are constructed like the propeller shown in FIGURE 7, or FIGURES 8 and 9, or FIGURES 17, 19 and 20. In FIGURE 7, the propeller comprises doughnut-shaped, inflated rings 58 and, attached to these rings, three elongated, inflated tubes (60, 64 and 66) on each side of tubes 58. In this view of FIGURE 7 one of the pair of leading-edge tubes 60 and one of the pair of trailing-edge tubes 66 are shown in section. The three or optionally four tubes on each side of the propeller shaft are of different diameters, and in this respect are like tubes 60, 62, 64 and 66 of FIGURE 8. They thus are flexible framework of the streamlined, aerodynamic propeller blades; and they are housed in a strongly resilient skin of the above-described type. The doughnut-shaped hub tubes 58 are also inclosed in such a skin. In the larger, leading-edge tube of each blade there is a taut bracing cable or rod 68, fastened at one end to the outer portion of the blade and at its other end to one of the tubes 58 and having a length that is less than that of the blade. The outer end of this guy 68 is fixed to a portion of the blade-tip end of tube 60 that is near the inlet of the airstream to the propeller; and the junction with tube 58 of the inner end of the guy is on the downstream side of tube 60. This type of taut fastening holds the propeller (or impeller) in the illustrated curved form, and strengthens it against collapse under is fluidstream load.

In the propeller of FIGURES 8 and 9 one long, main inflated tube 62 extends from the tip of one blade thru the hub portion to the tip of the opposite blade. It is thus a strongly bracing tube, which provides strength for the propeller against collapse under load. On each side of the propeller shaft 70, three other elongated inflated tubes 60, 64 and 66, have their closed hubward ends securely bonded to a streamlined metal clamp, 72 or 74. The two clamps are welded or otherwise fastened to shaft 70, and to each other at the contacting portions of their hubward faces. Each of the blades comprises a resilient skin that is bonded to the elongated tubes.

The propeller of FIGURES 19 and 20 comprises: doughnut-shaped inflated tubes 76, which with an enveloping skin form a hub of an axial extent greater than that of the blades; inflated blade tubes 78, 80 and 82, bonded to the hub tubes, and enveloped in a streamlined, airfoil skin; and an outer, blade-bracing, inflated ring 83, that is bonded to the tips of the blades.

Each of the above-described propeller tubes may be inflated with air but preferably it is inflated with lighter-than-air gas. These tubes preferably are made of plastic, reinforced with spring steel mesh or other resilient fabric.

Figure 16:
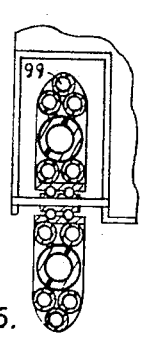
FIGURE 16 is a detail, sectional view of an optional type of wheel that may be used in the invented craft.

Most of the general principles of construction described above with especial reference to the species of FIGURES 1 to 4A obviously apply also to the other disclosed species of the invention. In the form of FIGURES 10 and 13 the vehicle comprises: ring or doughnut-shaped, inflated tubes 85, similar to the tubes 9 of FIGURE 1, that house floating lighter-than-air units 86 and inclose the lifting propellers 87: elongated, horizontal, inflated cabin-top tubes, 88, some of which (88') are bonded to the radially inner curved surfaces of the upper and lower ones of tubes 85; vertical, cabin-sidewall, inflated tubes, 90, that are bonded to tubes 88 and 88'; and support the forward propellers and their engines or motors; cabin deck tubes 91, beneath strong deck skins; top, horizontal, inflated tubes 92, which snugly fit within a streamlined skin to form an aerodynamic wing 94, that spans the distance between the vertical tubes and braces the vertical tubes and other parts together; and wheels (or floats) that support the landed craft. The preferred construction of the wheels is shown in FIGURE 16 as comprising nested, doughnut-shaped, inflated tubes of different diameters which bear against each other and are mutually braced against sidewise deformation. These, as well as the other strength-providing tubes of this invention, may be inflated with air; but preferably they are filled with lighter-than-air gas at a pressure considerably above that of the atmosphere at sea level.

The cabin, providing a load-confining space, comprises: forward and after load-containing sections 95A and 95B; side passages 95C, between 95A and 95B; foam-plastic side walls 95D; a door 95E; and strongly inflated deck tubes of the above-described type 95F. And in the upper part of the cabin spaces lighter-than-air units 97 are located; these are similar to the lowest group of containers 12 of lighter-than-air gas that are shown as in the cabin of FIGURE 2. Above the cabin there is an upper deck (similar to that of FIGURE 1) which comprises a strong skin over the long straight tubes 88 and the shorter straight tubes 88', which of course do not bridge over the annular inlet of the airstream to lifting propellers 87.

The lifting propellers 87 are of the previously described type shown in FIGURES 19 and 20. Each has an outer inflated ring 83, which transmits the propeller's lifting force to four idle pulleys 96. These pulleys are journalled on axles 97 that are fixed to doughnut-shaped, inflated rings 98; and rings 98 are securely tied and bonded to rings 85, within an enveloping skin. Preferably, pulleys 96 are made of inflated doughnut-shaped tubes of the type shown in FIGURE 16, except that the single, radially outer annular tube 99 of the wheel is omitted in the pulley, so that it has a largely cylindrical outer rim, to provide driving friction with the inflated outer ring of the propeller.

As shown in FIGURE 13 this species of the invention may include elongated balloons 101', which comprise flexible outer skins and, within the skins, a plurality of short, cylindrical, flexibly buffered lighter-than-air units. Other such balloons are shown at 101 and in FIGURE 35 at 103.

The two forms of this invention that are shown in FIGURE 13 and FIGURE 2 are closely similar in basic principles. Each comprises: the basic disclosed type of flexible wall, preferably comprising light-weight elements that contain lighter-than-air gas; a cabin within flexible walls, inclosing lighter-than-air units; a pair of resilient-walled, vertical-axis fluidstream conduits, and lifting propellers supported in the conduits; a light-weight but strong midship wing that is supported far above a main deck by light-weight, strongly inflated side elements which are spaced from the vertical-axis conduits; and at least one forward-traction motor-and-propeller assembly. But in FIGURE 2 the wing-supporting and bracing side elements 28 are short in fore-and-aft direction, whereas in FIGURES 10 and 13 the side elements (comprising inflated tubes 90 and optionally the balloons 101') extend nearly the full length of the craft, and preferably have streamlined tops, as illustrated in FIGURE 10. Also in FIGURES 10 and 13 these strongly flexible side elements support two forward-propelling assemblies, while in FIGURE 2 (and FIGURE 1, as well as in FIGURE 18) a forward propeller is supported by a cabin that is more narrow than that of FIGURE 13 and has a width considerably less than the diameter of the forward-traction propeller.

Figure 25:
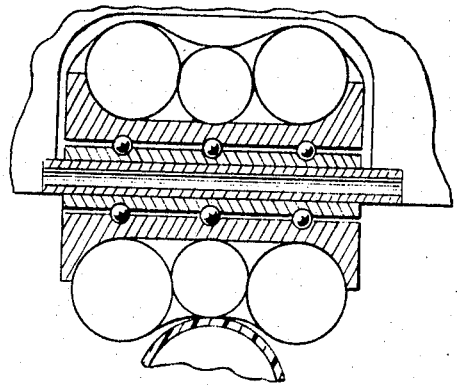
FIGURE 25 is a detail, sectional view from the plane 25—25 of FIGURE 21, showing one type of drive of the lifting propeller.

In the form of the invention shown in FIGURES 21 to 24, the forward propellers and the engines which drive them are supported by two relatively large, annular inflated rings 100. Abaft of these rings there are two other such annular tubes 102, and on each side of the load-confining cabin or fuselage 104 a pair of these rings strongly support a horizontal bar or rod on which pulleys 106 have bearings. The construction of these wheels 106 may be like that of rotary elements 96; but, alternatively, either element 96 or 106 may be of the type shown in FIGURE 25; or it may comprise a single hollow, thin-metal gas container, shaped to the desired form, inflated with air or helium, and encased in flexible plastic. If its metal is spring steel or resilient Phosphor bronze its plastic sheath may be reinforced only with fibers, but if the metal is ductile (copper, aluminum or soft iron) the sheath is reinforced with a mesh of spring steel, resilient Phosphor bronze or tough, springy plastic.

Figure 26:
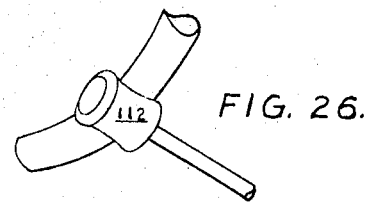
FIGURE 26 is a detail, perspective view of the general type of inflated friction-gearing drive of FIGURE 25.

The propeller-driving pulleys 108, that are shown in FIGURE 10 as rotatable by engine or motor 110, and the similar engine-driven pulley 112 of FIGURE 18, and the propeller-rotating pulleys that are driven by the engines of FIGURES 21 and 22 (and are similar to pulley 112 of FIGURE 26) may be constructed in any of the above-described ways. All of these inflated pulleys are friction-gearing wheels, which efficiently drive the inflated rings with which they have contact because of the inflation-insured tight engagement of the wheels with the rings. Very little (if any) slippage or heat from slippage is thus involved in this type of friction drive.

The upper, horizontal, inflated rings 114 of FIGURES 21 and 22 are securely bonded and tied to the tops of vertical rings 100 and 102, preferably with the use of nylon or wire cords 116, as illustrated in FIGURE 30. And to bottom portions of these vertical rings an inflated large-diameter, bracing ring 117 is similarly tied and bonded. This bracing ring is further strengthened by bonds to straight, inflated tubes 118 and 120.

Figure 27:
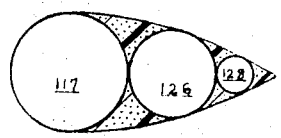
FIGURE 27 is a detail, sectional view from a vertical plane thru the longitudinal axis of the vehicle of FIGURE 21, showing the streamlined trailing edge tubes of the lower, after fairing and ring-bracing structure.

Two fairings are horizontally positioned on ring 117. One extends from the nose of the ring rearward to tube 120 and has a flexible skin 122, which snugly envelops tube 120 and the top and bottom of the forward portion of the ring; and it houses a multiplicity of flexibly buffered, lighter-than-air units 124 (shown in plan view as rectangular in FIGURE 21). The other fairing comprises a skin which loops around the forward one of tubes 118, extends aft over the tops and bottoms of the other tubes 118, and loops over inflated fairing tubes 126 and 128, which may comprise three arcuate tubes abaft and secured to ring 117 as shown in FIGURE 21 or three as illustrated in FIGURE 27. These tubular elements and an after part of ring 117 and tubes 118 and the skin which tightly envelops these elements form the after fairing on ring 117. And between this and the forward, lower fairing there is an air gap or space (between tubes 118 and 120) thru which the fluidstream from the lift fans may pass.

Another, similar but upper fairing comprises a flexible skin of the above-described type which bridges the space between the arcuate summits of the two vertical forward tubes 100 (to which it is bonded), extends aft between the two horizontal rings 114, and between the two arcuate summits of the after vertical tubes 102, to which it is bonded. This upper skin is also fixed to the top line of the cabin, and to the upper arcs of tubes 114, but it does not cover the propeller spaces within rings 114.

The horizontal stabilizing fins that are illustrated in FIGURES 21 and 34 comprise resilient tubes 129 of one of the above-described types, which, as indicated in FIGURE 34, are fixed to the tubes of the fuselage 104 and are inclosed within a skin.

One type of the flexibly buffered, lighter-than-air units which preferably are placed in the upper part of the inside cabin space of any of the forms of the invention is indicated in FIGURES 23 and 24 by the reference numeral 130. The light-weight, highly flexible buffers 132 that are between each pair of these units readily yield, as indicated in FIGURE 24, when the flexible cabin wall bends under a major shock. In FIGURES 23 and 24 this resilient cabin is illustrated as being of the type that is annular in cross section, shown in FIGURES 21, 22, 31 and 35. Elements 134 may be either endless flexible rings or helically wound tubular elements. Preferably, the aerostatic lifting units 130 are not only multiplied and buffered in a direction parallel to the vehicle's longitudinal axis, but also are plural and variously buffered (by pads 136, shown in FIGURE 22) along lines parallel to the transverse axis.

Figure 29:
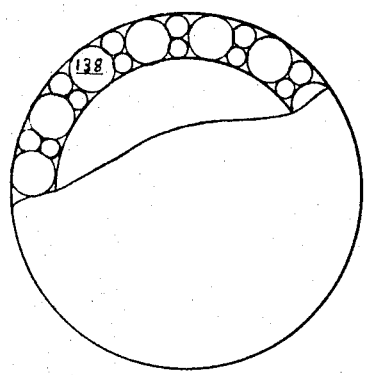
FIGURE 29 is a detail, elevational view of an optional form of the fuselage or cabin of FIGURE 21 or of FIGURE 10.
Figure 31:
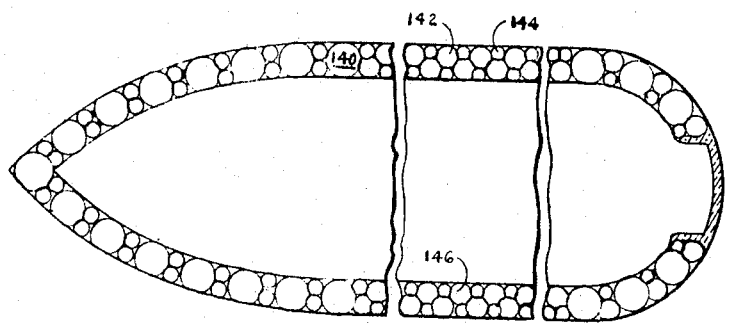
FIGURE 31 is a detail, sectional view from a plane thru the vehicle's longitudinal axis of the fuselage or cabin of FIGURE 29.

Two optional types of the load-containing or load-confining cabin structure, comprising a multiplicity of resilient, tubular rings of different diameters, encased in a flexible skin, are illustrated in FIGURES 29 and 31. In FIGURE 29, elongated, resilient tubes that extend in a fore and aft direction are shown as forming a flexible cabin framework similar to that formed by tubes 7 of FIGURES 1 and 2 (but round in transverse cross section); and in FIGURE 31, annular tubes comprise another somewhat similar flexible framework. In FIGURE 29, as well as in the left-hand part of FIGURE 31, large-diameter tubes 138 (or 140) are closely juxtaposed and flexibly bonded to pairs of similar tubes of smaller diameters. Thus they brace each other and the cabin skin and wall. In the middle, partly broken-away part of FIGURE 31, each outer large-diameter tube 142 is radially outward of and flexibly bonded to smaller tubes; and it is also bonded to small-diameter tubes 144 that are on its right and left, and to other large-diameter tubes 146 that are radially inward of the outer tubes.

Figure 32:
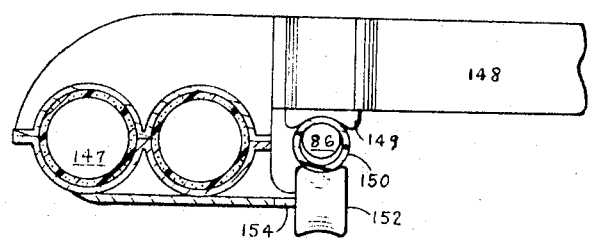
FIGURE 32 is a detail, sectional view of roller-bearing structure that supports and transmits the upward force of the lifting propellers of FIGURE 21.

An optional type of the upper vertical-ring and propeller-supporting structure is shown in FIGURE 32. Instead of each pair of vertical rings 100 and 102 of FIGURES 21 and 22, two such rings 147 are shown. They are tightly held in metallic clamps that are bolted and/or welded to bar 148. One of the pulleys that take the upward force of the lifting propellers is shown at 149; it is journalled in a looped, cavity-providing portion of the composite bar. The outer ring 150 of the lifting propeller, which is similar to ring 83 of FIGURE 19, is also supported by lower pulleys, one of which is shown at 152. It is journalled on shaft 154 that is welded to the lower arm of the clamps.

In the light of the above descriptions, the structure and operation of the invention species of FIGURES 14, 16 and FIGURES 17 and 18 probably will be obvious to a reader.

Figure 14:
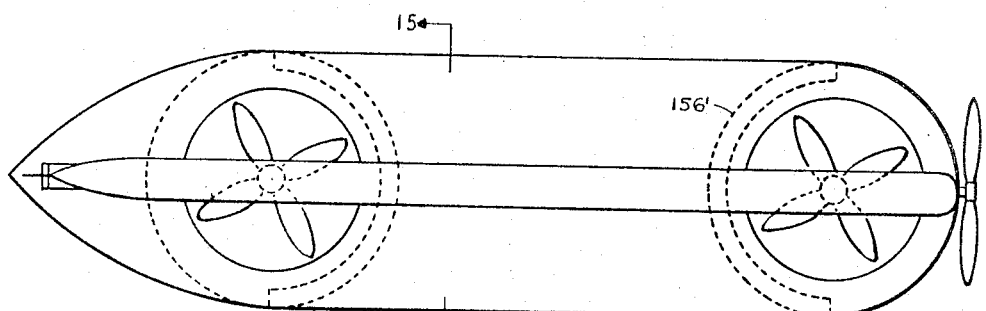
FIGURE 14 is a top plan view of a third form of the invention.
Figure 15:
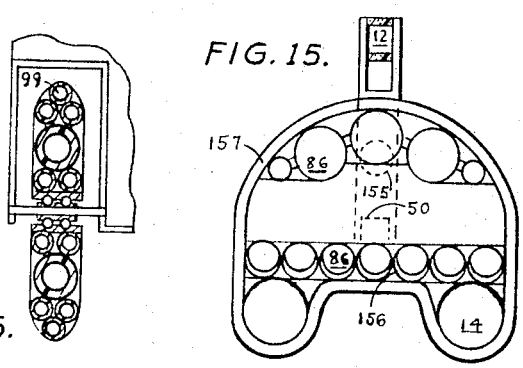
FIGURE 15 is a sectional view of the cabin of the vehicle of FIGURE 14 from the plane 15—15.

FIGURES 14 and 15 show, above the main cabin, an upper, balloon-like structure 16 of resilient-tube framework in a flexible skin of the above-described type. This superstructure contains flexibly buffered, lighter-than-air units 12, supports engines for the lifting propellers, and is tied and bonded to the arcuate, streamlined top of a wider, lower structure, which houses a useful load and the highly placed motor 155 of a forward propeller. The deck of the cabin space in the lower structure comprises elongated, resilient tubes 156, whose ends are cut to form upper and lower flanges 156' which fit on and are bonded to arcuate surfaces of the annular resilient tubes that house the lifting propellers. Around these tubes 156 and around the cabin space and lifting units 86 extend endless, resilient, arcuate, skin-covered tubes 157. The lower portions of these side-by-side tubes 157 are looped to form the flexible, skin-covered framework that houses the short, flexibly-buffered, lighter-than-air cylinders 14 of catamaran floats.

The portions of the narrow, balloon-like upper structure 16 which pass over the lifting propellers are horizontal and at the level of the uncovered small forward and larger after decks. The downward curving of the resilient superstructure-framework until it has a lower, horizontal level is not indicated in the plan view of FIGURE 14 because this curving has no angle where two planar surfaces meet. This curving downward at the bow and stern to the horizontal sections that bridge over the forward and after lifting propellers and brace the annular airstream channels may be achieved by bending tubes of the type shown in FIGURE 2 at 7 downward at both their forward and after ends. These superstructure-framework tubes thus follow the streamlined top of the lower cabin structure, to which, as stated above, they are tied and bonded.

The form of the invention shown in FIGURES 17 and 18 comprise two lifting propellers 158, each of which has a schematically illustrated central bearing, journalled on and transmitting the upward thrust and lift of the propeller to an axle that is fixed to the top of one of the two streamlined cabins and to an upper, horizontal, resilient ring. These helicopter propellers and the traction propeller 159 are driven by an engine located in a central, streamlined nacelle, which also houses fuel tanks. Flexibly buffered lighter-than-air units are shown in the upper portions of the cabin spaces; and a balloon 159, supported by curved, inflated, streamlined, orthogonally arranged tubular elements 160 and 162, adds aerostatic lift that is centered considerably above the craft's center of gravity.

The vehicle-bracing elements 160 and 162 have flexible-material walls. As illustrated in FIGURES 18 and 20A, member 160 comprises tubes 164, 166 and 168 of flexible-material walls and different diameters that, when inflated tightly, fit within streamlined skin 170, and thus form a bracing framework of the streamlined element 160. Member 162 is also streamlined, but by means of fairing tubes which have different diameters and are differently arranged in fore-and-aft streamlined tubular sets. As indicated in FIGURES 17 and 18, the long, basic bracing tube 164' arcs in semicircular fashion and has bottom ends that are joined to the top of inflated, resilient, horizontal tube 172. Around and abaft a substantial part of the forward arc of this tube 164' there is a streamlined skin 174, within which are housed inflated fairing tubes that are similar to tubes 166 and 168 of FIGURE 20A. And around and abaft a substantial part of the after arc of tube 164' there is a similar fairing skin 176, which also houses inflated fairing tubes that are similar to 166 and 168, and with the skin forms the after part of strut 162.

Each of the two cabins 178 is braced relative to the remainder of the craft in the following manner: at the top of the cabin by inflated tubes 180 (against which the propeller shaft has neck and thrust bearings) and annular tube 182 (in which the propeller shaft also has thrust bearings, and to which the bottoms of tubes 160 are attached); and at the bottom of the cabin by tube 172 (which optionally serves as a float, skid or wheel support); annular tube 184 (similar to 182, passing thru the bottoms of the cabins and tying them together); a pair of arcuate tubes (annular tubes 186 in FIGURE 17, with one looped over the other to brace the bottom of the engine nacelle 188, or, in FIGURE 18, parti-annular tubes 186' which are bonded with the nacelle-encompassing tube 187). The engine nacelle is also braced, at its top, by pulley axle 190. Each cabin has a deck, indicated at 192, which comprises tubes 194 and 196 within deck material that also contains arcs of tube 184.

In the claims, the word "plastic" is used to signify any type of natural or synthetic rubber or other plastic; the word gas to mean any pure gas or gaseous mixture; the word "fabric" to mean any kind of woven material or mesh, comprising fibers or metallic wire or filaments; and the word "tube" or expression "tubular elements" to mean a hollow article, elongated and having ends, or curved and endless, circular or noncircular in cross section, and open or sealed.

I claim:
1. A vehicle, comprising:
   vehicle-strength-providing framework;
   vehicular skin means, comprising fabric and waterproofing material that impregnates and coats the fabric, extending above and below said framework, and having smooth outer surfaces that are adapted to facilitate the flow of fluid over them; the said skin and framework being constructed and arranged to provide at least one pair of entrance and exit openings for the flow of propelled fluid thru an upright-axis passage from above portions of the vehicle to below portions of the vehicle;
   at least one upright-axis ring, between said entrance and exit openings, forming said passage, comprising:
   bracing-framework, connected to said vehicle- strength-providing framework; a ring skin, annular in cross section, comprising vehicle-strength-providing ring-fabric and waterproofing material coating the ring-fabric, and having radially inner surfaces adapted to contact said propelled fluid;

an upright-axis propeller, movable in relation to said ring, for propelling fluid thru said passage;

bearings for said propeller; and means, connected to said rings, for driving said propeller.

2. A device as set forth in claim 1, in which the said waterproofing materials comprise plastic.

3. A device as set forth in claim 2, in which said ring-fabric comprises metal.

4. A device as set forth in claim 2, in which said ring-fabric comprises metal and said first-named fabric comprises metal.

5. A device as set forth in claim 2, in which said ring-fabric comprises metal and said first-named fabric comprises interconnected fibers.

6. A device as set forth in claim 2, in which said ring-fabric and said first-named fabric are resilient.

7. A device as set forth in claim 2, in which said bracing-framework comprises tubular convolutions.

8. A device as set forth in claim 7, in which said tubular convolutions comprise parts of a tube that is helically coiled about the upright axis of said passage.

9. A device as set forth in claim 8, in which said tube contains gas under pressure that is well above that of the atmosphere.

10. A device as set forth in claim 8, in which said tube is of thin metal, is hermetically sealed, and contains gas at a pressure well above that of the atmosphere.

11. A device as set forth in claim 10, in which said metal is spring steel.

12. A device as set forth in claim 10, in which said gas is lighter than air.

13. A device as set forth in claim 2, in which said bracing-framework comprises an endless, doughnut-shaped tube.

14. A device as set forth in claim 13, in which said tube contains gas at a pressure greater than that of the atmosphere.

15. A device as set forth in claim 13, in which said tube is of metal, is hermetically sealed, and contains gas at a pressure well above that of the atmosphere.

16. A device as set forth in claim 2, in which said bracing-framework comprises a plurality of endless doughnut-shaped tubes, each of which is centered on the upright axis of said passage.

17. A device as set forth in claim 16, in which said tubes are metallic, are hermetically sealed, and contain gas at a pressure well above that of the atmosphere.

18. A device as set forth in claim 2, in which said upright-axis ring is pluralized, and the rings comprise a plurality of parallel-axis upright passages for propelled fluid; said device also comprising: a said upright-axis propeller adjacent to each of said rings; bearings for each propeller; and means for driving the propellers.

19. A device as set forth in claim 18, in which said bracing-framework comprises curved tubes.

20. A device as set forth in claim 19, in which said tubes are endless and doughnut-shaped and have centers on the upright axes of said upright passages.

21. A device as set forth in claim 19, in which said tubes are of metal, are hermetically sealed, and contain gas under pressure that is will above that of the atmosphere.

22. A device as set forth in claim 18, in which said vehicular skin means and the said ring-skin of each of the rings are flexible, and in which said device further comprises shock-absorbing resilient elements between said ring and vehicular skin means.

23. A device as set forth in claim 2, in which said vehicular skin means is flexible, and in which said device further comprises resilient elements between said ring and vehicular skin means.

24. A device as set forth in claim 23, in which said vehicle-strength-providing framework and ring are constructed and arranged to provide a load-confining space.

25. In a vehicle, structure that comprises:

outer skin means of flexible-metal fabric and plastic;

within and connected to said skin means, at least one ring of material which comprises metallic mesh and plastic impregnating and strengthening the mesh;

connected to said ring to to said skin means, a plurality of curved bracing elements, each of which comprises metallic mesh and plastic impregnating and strengthening this mesh;

force-transmitting means securely connecting said ring and bracing elements; and within said skin means, means for absorbing shocks to the skin means.

26. A device as set forth in claim 25, in which said curved bracing elements are blades of a propeller, and said ring is a means for bracingly connecting and rotating said blades.

27. A device as set forth in claim 26, in which said blades comprise tubes, curvingly shaped to facilitate propulsion of fluid.

28. A device as set forth in claim 27, in which said means for absorbing shocks is gas that is contained in said tubes and is under pressure that is well above that of the atmosphere.

29. A device as set forth in claim 28, in which said gas is lighter than air.

30. A device as set forth in claim 28 in which said ring is an endless, doughnut-shaped tube, and in which said means for absorbing shocks further comprises gas that is contained in said endless tube and is under pressure that is well above that of the atmosphere.

31. A device as set forth in claim 25, comprises a rotatable, friction-gearing wheel, in which said ring is an endless, doughnut-shaped tube, said curved bracing elements are other annular endless tubes which have major diameters that are different from that of said first-named endless tube, the outer curvature of each of said tubes being centered on the rotary axis of the wheel, and in which said means for absorbing shocks is gas, contained in said tubes under pressure that is well above that of the atmosphere.

32. A device as set forth in claim 31 which further comprises a rotatable friction-gearing element that is in frictional, force-transmitting contact with said friction-gearing wheel.

33. A device as set forth in claim 25, in which said skin, ring and curved bracing elements are constructed and arranged to provide a load-confining space, within a portion of said skin means, and in which said means for absorbing shocks comprises flexible plastic.

34. A device as set forth in claim 25, in which said curved bracing elements comprise at least parts of a load-confining cabin that is well spaced inward of the outermost parts of said skin means and upwards from the lowermost parts of the skin means, for protection of the cabin from major shocks; and in which said means for absorbing shocks comprises resilient elements between said cabin and said outermost and lowermost parts of the skin means.

35. A device as set forth in claim 34 which further comprises aerostatic means for exerting a lifting force on the cabin, said force being centered at a point above the center of gravity of the vehicle.

36. A device as set forth in claim 25, in which said ring is pluralized, in which the rings have parallel axes, and each ring bears against another ring, bears against at least one of said bracing elements, and bears against a portion of said skin means.

37. A device as set forth in claim 34, in which the axes of a plurality of said rings are upright and parallel and each of said plurality of rings forms an upright passage for propelled fluid from above part of the vehicle to below the major portion of the vehicle; said device further comprising: a motor and propeller adjacent each upright-axis ring for forcing fluid through said passages: a propeller and a motor for driving it located above the center of gravity of the vehicle; and a power plant, located in a low part of said cabin, supplying driving energy to said motors.

38. A structure of the character described comprising:
a tube having a skin of fabric impregnated with plastic;
in said tube a plurality of sealed receptacles having thin walls that are circular in cross-section;
gas in the said walls under pressure greater than that of the atmosphere; and
porous plastic surrounding said receptacles, between them and the skin.

39. A device as set forth in claim 38, in which said gas is lighter-than-air, and in which said porous plastic is flexible.

40. A device as set forth in claim 38, in which said frabric is of metal.

41. A device as set forth in claim 38, in which said walls are of metal.

42. A device as set forth in claim 38, in which said tube is endless and doughnut-shaped.

References Cited
UNITED STATES PATENTS

| | | | |
|---|---|---|---|
| 1,667,002 | 4/1928 | Hall | 244—5 |
| 1,860,087 | 5/1932 | Fehrenbach | 244—5 |
| 3,229,935 | 1/1966 | Bellanca | 244—123 |

FOREIGN PATENTS

| | | |
|---|---|---|
| 837,591 | 6/1960 | Great Britain. |

MILTON BUCHLER, *Primary Examiner.*

THOMAS W. BUCKMAN, *Assistant Examiner.*